United States Patent Office 3,597,208
Patented Aug. 3, 1971

3,597,208
PROCESS FOR PRODUCING PHOTOGRAPHIC
LIGHT-SENSITIVE ELEMENTS
Fumihiko Nishio, Nobuo Tsuji, and Azusa Ohashi,
Kanagawa, Japan, assignors to Fuji Shashin Film Kabushiki Kaisha, Kanagawa, Japan
No Drawing. Filed Mar. 8, 1967, Ser. No. 621,422
Claims priority, application Japan, Mar. 9, 1966,
41/14,485
Int. Cl. G03c 1/76, 3/00
U.S. Cl. 96—67
10 Claims

ABSTRACT OF THE DISCLOSURE

The susceptivity of the surface of a photographic light sensitive element to humidity can be decreased and the adhesion of the photographic light sensitive element to itself or to other surfaces can be completely prevented by applying to the surface of the photographic light sensitive element an organic solvent solution containing at least one member selected from the group consisting of a styrene-maleic anhydride copolymer, a partial half-ester copolymer thereof, and complete half-ester copolymer thereof and drying it.

BACKGROUND OF THE INVENTION

The present invention relates generally to a process for the production of a photographic light sensitive element and more particularly to a process for the production of a photographic light sensitive element having a surface layer wherein its adhesivity to other surfaces has been prevented.

(1) The prior art

Since the emulsion layer surface and the back surface of a conventional photographic light sensitive element, e.g., a conventional photographic film, is a smooth surface of a gelatin layer, when the films are rolled up, piled or loaded in a camera, there is a tendency for the surfaces of the film to adhere to each other or to the surfaces of the camera, whereby the surfaces of the film are injured or wherein static marks are formed. Accordingly, in order to overcome these drawbacks, various methods have been adopted to coarsen the surface of these coated layers. For coarsening the surface of a photographic film, it has hitherto been proposed to incorporate in a photographic layer such as a light sensitive emulsion layer, a protective layer, an antihalation layer and the like, a water insoluble solid powder, for example, an inorganic material uch as silica, zinc carbonate, glass particles, cadmium carbonate, strontium carbonate, and the like, or an organic material such as a calcium salt or magnesium salt of an aliphatic acid, starch, terephthalic acid, polycarbonate and the like. However, when such a material is added to a coating solution for such photographic layers, such solid particles are aggregated or precipitated in the dispersion during the preparation thereof. Moreover the solid particles are present in the photographic layer in the same density as in the surface thereof, which reduces the transparency of the photographic film. Further, in the case where a surface coarsening agent (or matting agent), which can be dissolved off during the developing process, is employed for making the layer transparent after coating, the material is not completely dissolved off caused by the shortage of the processing period and the transparency is reduced.

Moreover, when the matting agent is dispersed in a coating liquid before coating, a large amount of the matting agent having a large grain size is necessary for effectively preventing the adhesiveness of the surface of a photographic film. Therefore the particles of the matting agent are coated with gelatin, which results in reducing the transparency still more. Furthermore, by such a conventional method, it is impossible to sufficiently prevent the adhesiveness of the surfaces of a photographic film when they are treated under a high humidity.

(2) Brief summary of the invention

An object of this invention is to provide a process for producing photographic light sensitive elemnts having none of the prior art disadvantages.

Another object of this invention is to provide a surface treatment of photographic light sensitive elements for reducing the adhesiveness thereof.

The inventors have found that the susceptibility of the surface of a photographic light sensitive element to humidity is lost and the adhesion of the photographic light sensitive element to itself or to other surfaces can be completely prevented by applying to the surface of the photographic light sensitive element a solution of a styrene-maleic anhydride copolymer, or a partial or complete half-ester copolymer thereof which is insoluble in water but sufficiently water permeable when it is present as a thin film, followed by drying.

The copolymers used in the present invention are represented by the following general formula:

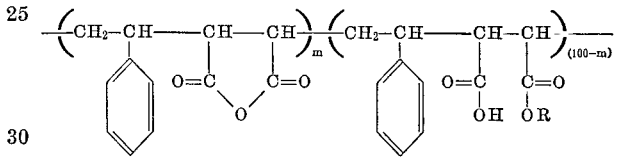

wherein R represents an alkyl group having from 1 to 12 carbon atoms or hydrogen and $m$ represents 0 or a positive number from 0 to 100 (percentage), $m$ and $100-m$ representing, respectively, the percentage of each polymer in the copolymer.

The above materials are insoluble in water but are soluble in the usual organic solvents such as alcohols, ketones, and esters. Moreover, the solutions thereof in these solvents are stable and can be dried rapidly. Further, since the copolymers of this invention are water insoluble, the applied and dried coatings of the copolymers show neither hygroscopicity nor susceptibility to humidity. Further, thin films of the copolymers are transparent or slightly translucent. Moreover, although the copolymers are insoluble in aqueous alkali solutions and hence processing for the photographic light sensitive elements, in particular the development thereof, is not accompanied by the prior art inconveniences such as the reduction of development speed owing to the presence of coatings over the copolymer.

Furthermore, since the copolymers of this invention are soluble in aqueous alkali solutions, thin films of the copolymer are dissolved off during development in a solution and hence are not left on the surface of the light sensitive element after development. Thus, the processing of the light sensitive elements in an acid bath for stopping or fixing can be conducted without effecting the copolymer film. Moreover, inasmuch as the extent of the antihygroscopicity and the solubility of the copolymers of this invention are influenced by the nature of the alkyl groups in the copolymers and the extent of half-esterification, they can be selected according to the particular purpose desired.

In general, as the number of carbon atoms in the alkyl group of the ester group increases, the copolymers become hydrophobic, the adhesive properties thereof are reduced and the adhesion preventing power of the copolymers becomes larger; however, the bad effect thereof on the development process becomes greater. Therefore, the number of carbon atoms of the alkyl group is preferably less than 12 and, more preferably, less than 5 carbon atoms such as, e.g., methyl, ethyl, propyl, isopropyl, butyl, isobutyl, tert-butyl, amyl, isoamyl, sec-amyl, and ter-amyl groups and the like. However, for some uses, an octyl group having 8 carbon atoms may be employed. The esterification degree may be changed according to the particular purpose desired. Although not critical, best results are obtained when $m$ is from 0 to 50. Also, the molecular weights of the copolymers are not critical. However, for forming a film having sufficient strength, copolymers having molecular weights of from 10,000 to 100,000 are preferable.

When the copolymer is dissolved in an organic solvent and the solution is applied to the surface of an emulsion layer of a photographic light sensitive element according to the process of the present invention, a transparent or translucent thin film is obtained on the surface thereon without formation of the opaque properties after development caused by the presence of a dense matting agent at the surface of and in a photographic layer thereof as in the above mentioned conventional manner.

Further, in the process of this invention, the surface of films may be coarsened or matted by selecting a suitable kind of solvent or a suitable drying method for the application of the organic solvent solution of the copolymer. In this case, the process of the invention is particularly effective in the prevention of adhesion as well as the occurrence of static marks.

The invention will now be explained in detail. The coating amount of the above mentioned copolymers is preferably 0.005-1 g. particularly 0.02-0.3 g. per square meter of the surface area of a photographic light sensitive element.

As the solvent for the copolymer of this invention may be used rapid drying ones which have no adverse effects on photographic light sensitive elements and provide low surface tension such as alcohols, ketones and esters. For example, suitable solvents are methanol, ethanol, isopropanol, butanol, acetone, methyl ethyl ketone, methyl acetate, ethyl acetate and the like. In some cases, a high boiling solvent such as methyl Cellosolve, ethyl Cellosolve, butyl acetate and the like may be employed. Further, the above mentioned solvents may be used alone or as mixtures thereof. For improving the coating properties or preventing the formation of static marks, a surface active agent or an antistatic agent may be incorporated in the coating composition containing the copolymers of this invention, whereby the properties of the surface can be further improved.

According to the present invention, the surfaces of thus obtained photographic light sensitive elements have no hygroscopic property and hence no adhesion of the surface of the light sensitive element occurs even under high humidity and the surfaces thereof are not injured. Further, the formation of static marks are prevented under low humidity. Moreover, since thus formed films of the water insoluble copolymers are transparent or translucent, the photographic properties of the photographic light sensitive element are not reduced thereby. Furthermore, since the films of the copolymers can be easily dissolved off during processing, transparency of the light sensitive element during or after processing is not reduced.

DETAILED DESCRIPTION OF THE INVENTION

The invention will further be illustrated by the following examples, but it should be understood that the invention is not limited thereto.

EXAMPLE 1

To a support of cellulose triacetate was applied a photographic silver iodo-bromide emulsion for X-ray photographic film (solid content 15.2%) in an amount of 140 g. per one square meter of the support and after cooling an aqueous 2.5% gelatin solution was applied thereto as a protective layer in an amount of 60 g., per one square meter and dried in warm air for 15 minutes at 30° C. and then for about 60 minutes at 36° C. to provide a photographic film. Thereafter, a methanol solution of the aliphatic alcohol half-ester of the copolymer of styrene and maleic anhydride corresponding to the above mentioned general formula wherein $m$ is 0 in a concentration shown in the following table was applied thereto in an amount of 25 g. per one square meter and dried for about 20 seconds by the hot air of 40° C. The thus formed film was translucent. The film was contacted with a fluorescent sensitizing paper under a pressure of 1800 g. per 100 square centimeters in an atmosphere of 30° C. and 90% relative humidity. After 8 hours, the assembly was withdrawn, the film was stripped from the paper, developed, and the extent of adhesion of the film to the paper was determined by measuring the blackened area of the film by the sensitization caused by adhesion. The results are shown in the following table.

EXPERIMENTAL CONDITIONS AND RESULTS

| Test No. | R | Conc. of copolymer, percent | State of coating | Blackened area by adhesion, percent | Transparency after processing |
|---|---|---|---|---|---|
| 1 | | None | Smooth | 30 | Good. |
| 2 | $CH_3$ | 0.08 | Coarse | 10 | Do. |
| 3 | $CH_3$ | 0.2 | do | 5 | Do. |
| 4 | $CH_3$ | 0.4 | do | 0 | Do. |
| 5 | $CH_3$ | 0.6 | do | 0 | Do. |
| 6 | Iso-$C_4H_9$ | 0.4 | do | 0 | Do. |
| 7 | Sec-$C_5H_{11}$ | 0.4 | do | 0 | Slightly bad. |
| 8 | $C_8H_{17}$ | 0.4 | do | 0 | Do. |

EXAMPLE 2

A photographic film was prepared by using the same materials as in Example 1 but was dried for 10 minutes at 33° C. and then for about 45 minutes at 43° C. Thereafter, a 0.4% methanol solution of the half-ester of the styrene-maleic anhydride copolymer was applied thereon and dried as in Example 1. The results are shown in the following table.

EXPERIMENTAL CONDITIONS AND RESULTS

| Test No. | R | Drying temp. of film | Blackened area by adhesion, percent | Transparency after processing |
|---|---|---|---|---|
| 1 | None | 30° C. (10 minutes) / 36° C. (60 minutes) | 30 | Good. |
| 9 | do | 33° C. (10 minutes) / 43° C. (45 minutes) | 50 | Do. |
| 10 | $CH_3$ | 43° C. (45 minutes) | 5 | Do. |
| 11 | $C_8H_{17}$ | do | 0 | Slightly good. |

EXAMPLE 3

A photographic film was prepared as in Example 1 and to the surface of the thus prepared film was applied a solution consisting of a 0.4% methanol solution of the styrene-maleic anhydride copolymer (corresponding to the general formula wherein $m$ is 100) and a 10% aqueous solution of polyoxyethylene nonylphenyl ether (degree of polymerization is 8.5) in an amount of 10 ml. per one liter of the methanol solution, followed by drying. When the blackened area by adhesion was measured as in Example 1, no blackening was observed. Further, when the film was placed in an atmosphere of 30° C. and 20% relative humidity and the surface of it rubbed by a rubber roller, no static marks were observed. Whereas, when the same experiment was repeated on the photographic film coated with the copolymer solution containing no polyoxyethylene nonylphenyl ether and not subjected to surface treatment, spot-like static marks were formed in the former and branch-like static marks were markedly formed in the latter.

EXAMPLE 4

The emulsion for X-ray photographic film as in Example 2 was coated and dried under the same conditions as Example 2. The partial half-ester of the styrene-maleic anhydride copolymer shown in the following formula.

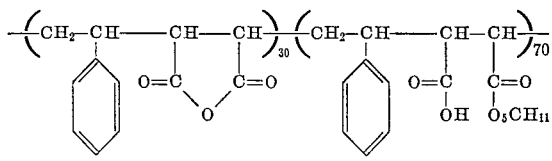

was dissolved in ethyl acetate in a concentration of 1–6 g./1000 ml. and the solution was mixed with an aqueous 10% solution of polyoxyethylene nonylphenyl ether (degree of polymerization—8.5) in an amount of 10 ml. per one liter. The resulting solution was applied to the emulsion layer surface of the photographic film in an amount of 25 g. per one square meter and dried. The results are shown in the following table.

EXPERIMENTAL CONDITIONS AND RESULTS

| Test No. | Amount of copolymer, grams | State of coating | (A)[1] (B) | (C) | Blackened area by adhesion, percent | Static[2] prevention |
|---|---|---|---|---|---|---|
| 1 | None | Smooth | 100 | 0.06 | 30 | Bad. |
| 12 | [3]0 | do | 100 | 0.06 | 30 | Good. |
| 13 | 1 | do | 100 | 0.06 | 10 | Do. |
| 14 | 3 | do | 100 | 0.06 | 10 | Do. |
| 15 | 6 | do | 100 | 0.06 | 5 | Do. |

[1] Developed for 4 minutes at 20° C. in X-ray film developer (Rendo made by Fuji Photo Film Co.).
[2] Determined by the method shown in Example 3.
[3] Coated with only polyoxyethylene nonylphenyl ether.

NOTE.—(A)=Photographic property; (B)=Relative sensitivity; (C)=Fog density.

EXAMPLE 5

To a support of cellulose triacetate was applied a photographic silver bromo-chloride emulsion for cine films (solid content 14%) in an amount of 140 g. per one square meter thereof and then dried for 5 minutes at 33° C. and for about 35 minutes at 45° C. to provide a photographic film. Thereafter, a 0.4% methanol solution of the ethyl half-ester of the styrene-maleic anhydride copolymer (corresponding to the above mentioned general formula wherein R is $C_2H_5$) is applied to the photographic film in an amount of 25 g. per one square meter thereof. The thus prepared film was cut into 35 mm. widths, perforated, placed in an atmosphere of 65% relative humidity, and the resulting film of 303 meters in length was rolled around a core of 49.5 mm. in diameter under the tension of 600 g., which was then closed in a can. Thereafter, the can was allowed to stand for 20 days in a constant humidity chamber at 50° C., the film was then exposed and developed such that the average optical density became 0.5, and then the blackened extent was measured, which indicated that no defects were observed. On the other hand, when the same test was conducted about the same cine film untreated with the copolymer of this invention, spot-like density unevenness was observed on the core side surface of the film

EXAMPLE 6

To a support of cellulose triacetate was applied as an antihalation layer a 10% gelatin solution containing an antihalation dye, bis(3-methyl-1-[4-sulfophenyl]pyrazole-5-on)pentamethine oxanol in an amount of 110 g. per one square meter of the support, and the thus coated layer was dried for 5 minutes at 33° C. and then for about 30 minutes at 45° C. Thereafter, a 0.4% methanol solution of the styrene-maleic anhydride copolymer (the copolymer shown in Example 4 wherein, however, $C_5H_{11}$ is replaced with $C_8H_{17}$) was applied thereto in an amount of 25 g. per one square meter and dried by the hot air of 40° C.

Then, the film was placed in an atmosphere of 25° C. and 85% and 90% relative humidity and the thus formed layer was contacted with the back side of the support under a pressure of 1200 g. per 100 square centimeters. The film was allowed to stand for 24 hours in that condition, the film was stripped from the backside surface and the extent of adhesion was detected, which showed that no ferrotype-like luster was observed. On the other hand, when the same test was conducted on the photographic film untreated with the copolymer, about 3% and 25% of ferrotype-like lustrous area was observed at 85% and 90% relative humidity respectively.

What is claimed is:

1. A process for preventing adhesivity and reducing susceptibility to moisture of a photographic light sensitive element which comprises applying to the surface of a gelatin-containing layer of said photographic light sensitive element an organic solvent solution containing at least one member selected from the group consisting of a copolymer of styrene and maleic anhydride, a copolymer of styrene and a half-ester of maleic acid and maleic anhydride and a copolymer of styrene and a half-ester of maleic acid, said copolymer having the following general formula:

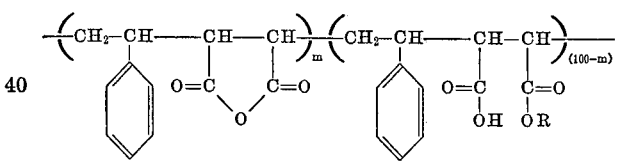

wherein R represents a member selected from the group consisting of hydrogen and an alkyl group having from 1 to 12 carbon atoms, and $m$ represents 0 or a positive number of from 0 to 100, $m$ and $(100-m)$ representing, respectively, the percentage of each monomer in the copolymer, said copolymer having a molecular weight of from 10,000 to 100,000 and being the only essential polymer in said solution.

2. The process as claimed in claim 1 wherein said solvent is selected from methanol and ethyl acetate.

3. The process as claimed in claim 1 wherein said R is an alkyl group selected from the group consisting of ethyl, propyl, butyl, amyl and octyl.

4. The process as claimed in claim 1 wherein said organic solvent solution additionally contains polyoxyethylene nonylphenol ether.

5. The process of claim 1 wherein said gelatin-containing layer is a silver halide emulsion layer.

6. The process of claim 1 wherein said copolymer is soluble in an aqueous alkali solution.

7. The process of claim 1 wherein $m$ is from 0 to 50.

8. The process of claim 1 wherein said solution is coated onto said photographic light-sensitive element in an amount within the range of from 0.02–0.3 gram per square meter of the surface area of said photographic light-sensitive element.

9. The process of claim 1 wherein said organic solvent solution consists essentially of a member from said group and said organic solvent.

10. The process of claim 1 wherein said photographic light sensitive element comprises a light sensitive layer carried on a support, and further wherein said gelatin-containing layer is on the same side of the support as said light sensitive layer.

References Cited

UNITED STATES PATENTS

| 2,984,568 | 5/1961 | Hart et al. | 96—84 |
| 2,494,054 | 1/1950 | Nardeau et al. | 96—87A |
| 2,639,234 | 5/1953 | Morey et al. | 96—87A |
| 3,300,313 | 1/1967 | Vrancken et al. | 96—87 |
| 3,371,130 | 2/1968 | Seiffert et al. | 117—Artistic Digest |

FOREIGN PATENTS

| 1,055,713 | 1/1967 | Great Britain | 96—67 |

DAVID KLEIN, Primary Examiner